United States Patent [19]

Hammer et al.

[11] Patent Number: 5,747,883
[45] Date of Patent: May 5, 1998

[54] FAN AND GENERATOR VARIABLE SPEED DRIVE MECHANISM

[75] Inventors: Michael Frederick Hammer, Carmel; Robert Franklin Combs, Mulberry, both of Ind.

[73] Assignee: General Motors Corporation, Detroit, Mich.

[21] Appl. No.: 652,738

[22] Filed: May 23, 1996

[51] Int. Cl.[6] .................................................. H02P 9/04
[52] U.S. Cl. ........................ 290/1 B; 322/40; 475/149; 123/41.49
[58] Field of Search ........................ 290/1 C, 1 B; 123/41.11, 41.49, 41.65

[56] References Cited

U.S. PATENT DOCUMENTS

| | | | |
|---|---|---|---|
| 1,219,562 | 3/1917 | Kouyoumjian | 290/1 B |
| 1,838,806 | 12/1931 | Cappa | 290/1 B |
| 2,327,769 | 8/1943 | Claytor | 475/156 |
| 5,358,456 | 10/1994 | Deppert et al. | 475/154 |

*Primary Examiner*—Steven L. Stephan
*Assistant Examiner*—Nicholas Ponomarenko
*Attorney, Agent, or Firm*—Donald F. Scherer

[57] ABSTRACT

The cooling for large track laying type vehicles is provided by a fan which circulates air through the powertrain compartment and a radiator. The fan speed is varied to reduce the power requirement when maximum air flow is not needed. The speed of the fan is modulated relative to the engine speed by a separate drive mechanism. The electrical generator speed can also be modulated simultaneously with the fan drive. To provide a compact arrangement, the fan input shaft and generator input shaft are coaxially disposed such that the fan structure surrounds the outer periphery of the generator.

3 Claims, 4 Drawing Sheets

FAN AND GENERATOR VARIABLE SPEED DRIVE MECHANISM

TECHNICAL FIELD

This invention relates to cooling systems, and more particularly, to the drive mechanisms for the cooling fan.

BACKGROUND OF THE INVENTION

Cooling systems for track laying type vehicles include and engine driven fan to provide air flow. The fan is ducted through the powertrain compartment and over the cooling coils of the radiator. The fan is driven directly by the engine, and in some installations, a thermoclutch might be included to reduce the fan speed during cold startup. The engine also drives a generator which supplies electrical power for the powertrain and other vehicle functions.

The drive mechanism for the fan and the generator are also housed in the powertrain compartment and require space thereby increasing the size of the powertrain compartment resulting in either increased overall vehicle size or reduced occupant space availability.

SUMMARY OF THE INVENTION

It is an object of this invention to provide an improved fan and generator drive for a vehicle cooling system.

The cooling fan drive shaft is rotatably supported coaxially with the generator drive shaft. Gear mechanisms are provided to transfer input power from one or more power sources to each of the drive shafts.

In one aspect of the invention, a gear train is disposed between the vehicle engine and the generator drive shaft and between the engine and the fan drive shaft. The gear train to the fan drive shaft incorporates a variable or modulated drive mechanism such that the fan can be driven at a speed independent of the engine speed.

In another aspect of the invention, the engine output shaft generator drive shaft, a modulating shaft, and the fan drive shaft are interconnected by a planetary gear arrangement. With the planetary gear arrangement, the fan speed can be controlled or modulated by the rotation of the modulating shaft which is connected with one of the planetary members. The generator speed can be equal to the engine speed or the fan speed depending upon the connections in the planetary gear arrangement. In one embodiment, the generator drive shaft is connected with the gear member driven proportional to engine speed and in another embodiment, the generator drive shaft is connected with the gear member driving the fan drive shaft.

DESCRIPTION OF THE EXEMPLARY EMBODIMENTS

Figure 1:
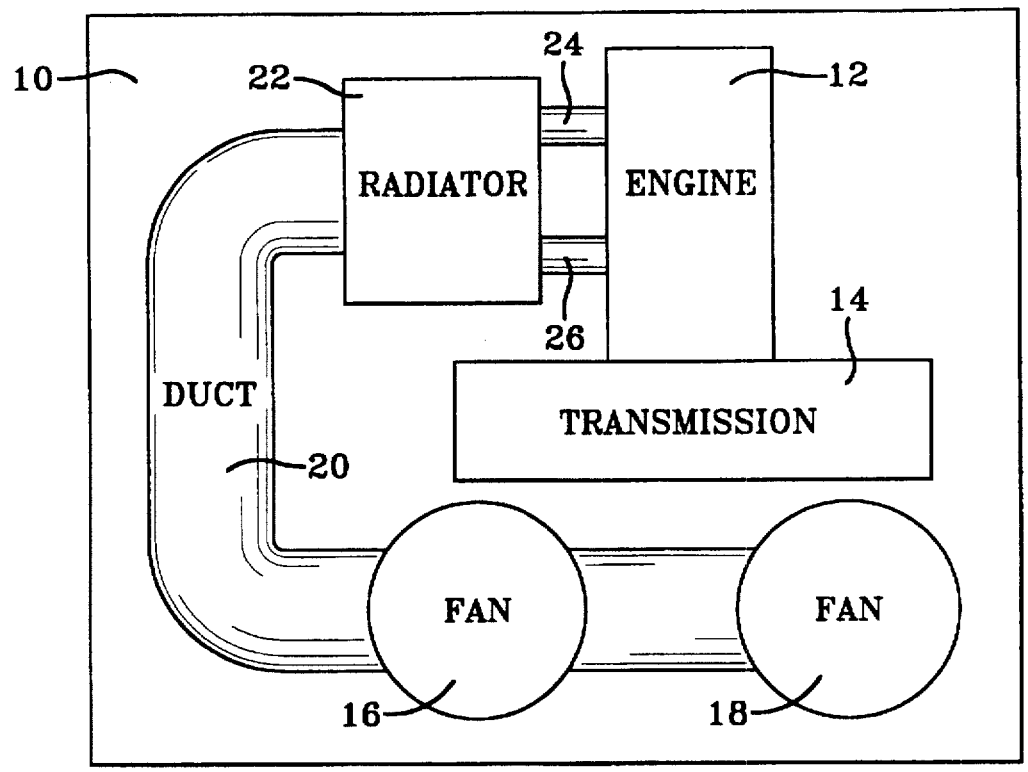
FIG. 1 is a block diagram of a powertrain compartment for a track laying vehicle.

The depiction of FIG. 1 is that of a powertrain compartment 10 disposed within a track laying type vehicle. The powertrain disposed within the compartment incorporates an engine 12 and a transmission 14. The engine is drivingly connected with one or more fans 16 and 18 which are disposed to circulate air through a duct 20 and over a radiator 22. The radiator 22 has fluid lines 24 and 26 which circulate cooling fluid through the engine 12 and transmission 14.

Figure 2:
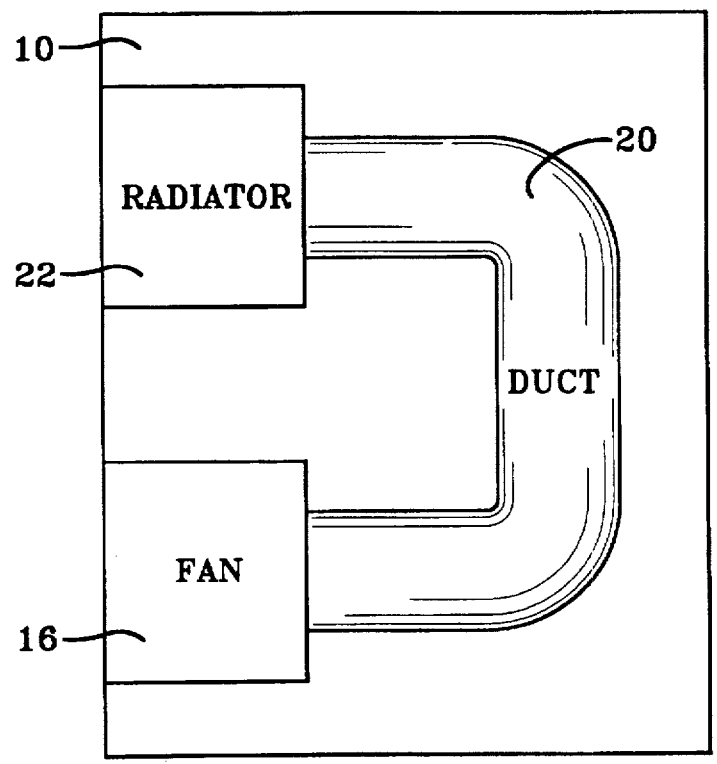
FIG. 2 is a block diagram of the powertrain compartment showing the interconnection between the fan and radiator.

FIG. 2 is another depiction of the powertrain compartment 10 joining the duct work 20 disposed between the fan 16 and the radiator 22.

Figure 3:
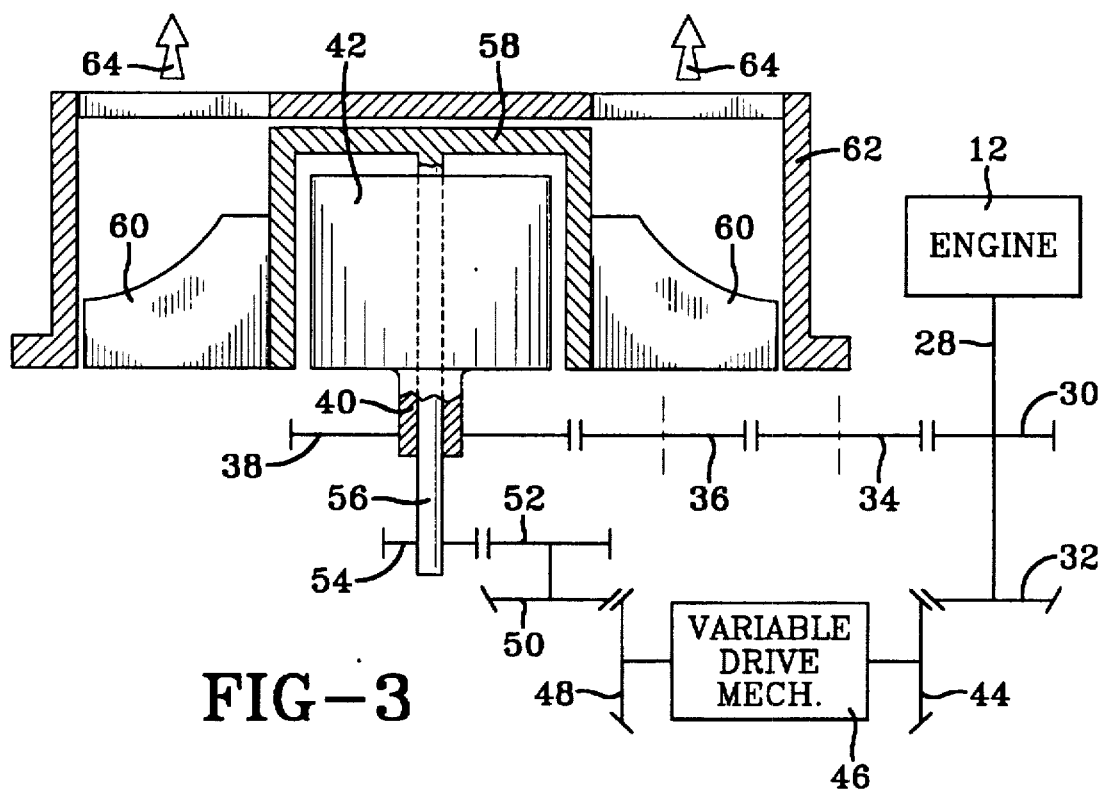
FIG. 3 is a diagrammatic and schematic representation of one embodiment of the invention incorporating separate gear trains from the engine to the generator and fan.

In FIG. 3, the engine 12 is drivingly connected with an engine output shaft 28 on which is disposed a spur gear 30 and a bevel gear 32. The gears 30 and 32 rotate continuously with the engine output shaft 28. The gear 30 is connected through a pair of idler gears 34 and 36 with a generator drive gear 38. The generator drive gear 38 is connected to continuously rotate an input shaft 40 for a conventional generator assembly 42. The bevel gear 32 is connected with a bevel gear 44 which is drivingly connected with a variable drive mechanism 46.

The drive mechanism 46 can be any of the well known varieties that are available, such as slipping clutches or hydrostatic transmission arrangements, or belt drives. Those familiar with this art will be aware of the many mechanisms available for variable drive ratios between an input shaft and an output shaft. The drive mechanism 46 is connected on the output side thereof with a bevel gear 48 which, in turn, meshes with a bevel gear 50. The bevel gear 50 drives a spur gear 52 which meshes with a spur gear 54 which is drivingly connected with a modulating shaft 56.

The modulating shaft 56 passes through the generator 42 and is coaxial with the input shaft 40 thereof. The modulating shaft 56 is drivingly connected with a hub 58 on which is disposed a plurality of fan blades 60. The fan blades 60 rotate within a fan shroud 62 for delivery of air in the direction of the arrows 64. The air flow, as seen in FIGS. 1 and 2, is directed through the fan to atmosphere. Thus, the fan draws air into the powertrain compartment 10 to flow pass the engine and transmission to induce some cooling and through the radiator 22 to induce further cooling. The air passing through the radiator 22 is ducted through the passageway 20 through the fans 16 and 18. The fans 16 and 18 eject the air in the direction of arrows 64.

In the drive system shown in FIG. 3, the generator 42 is driven directly proportional to the speed of engine 12 through the gear train, including gears 30, 34, 36 and 38. Thus, as engine speed increases, the speed of generator input shaft 40 also increases. A decrease in engine speed likewise produces a decrease in the speed of the generator input shaft 40.

The fan drive is also driven by power from the engine through the variable drive mechanism 46. However, the drive mechanism 46 will permit the output speed, or the speed of gear 48, to vary independently of the speed of the engine 12. For example, the engine 12 can be operating at maximum speed and the variable drive mechanism 46 can permit zero speed throughput such that the fan blades 60 would not be rotating. Likewise, the engine 12 can be rotating at an idle number, such as 800 rpm, and the variable drive mechanism can be placed in an overdrive system, such that the gear 48 will be rotating at a speed considerably greater than the idle speed of the engine.

The control of the variable drive mechanism 46 can be with any of the many well known control systems, such as electrical systems, hydraulic systems or mechanical systems. Those familiar with the art will be well aware of the types of controls that are available for such systems.

Figure 4:
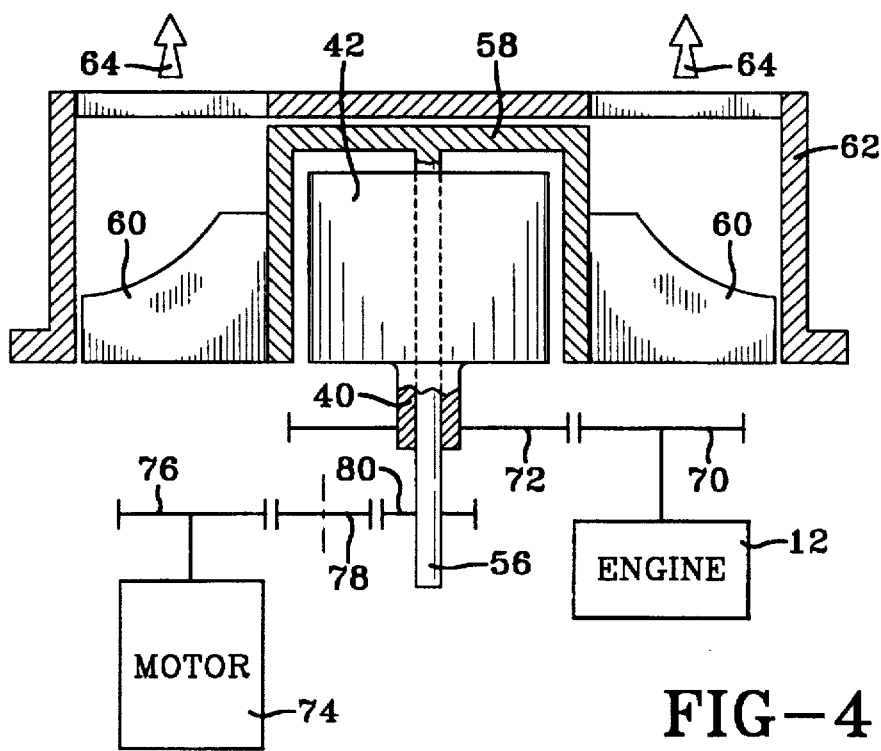
FIG. 4 is a schematic and diagrammatic representation of another embodiment of the invention depicting a fan shaft driven directly by a modulating unit.

The drive system shown in FIG. 4 includes the engine 12 drivingly connected with a spur gear 70 which meshes with a spur gear 72 which, in turn, is drivingly connected with the generator input shaft 40. The input shaft 40 drives the generator 42 at a speed proportional to the engine 12 as determined by the ratio of the gear 70 and 72.

The modulated shaft 56, which is the input shaft for the fan hub 58, is driven from a motor 74 through a spur gear 76, and idler gear 78 and a driven gear 80. The motor 74 can be electrical, hydraulic or pneumatic, whichever is most desirable or efficient for a specific installation. The speed of the motor 74 can be controlled through a speed range including zero, such that the fan blades 60 can be rotated at a speed completely independent of the engine 12 to thereby control the airflow 64 as desired by the system.

Figure 5:
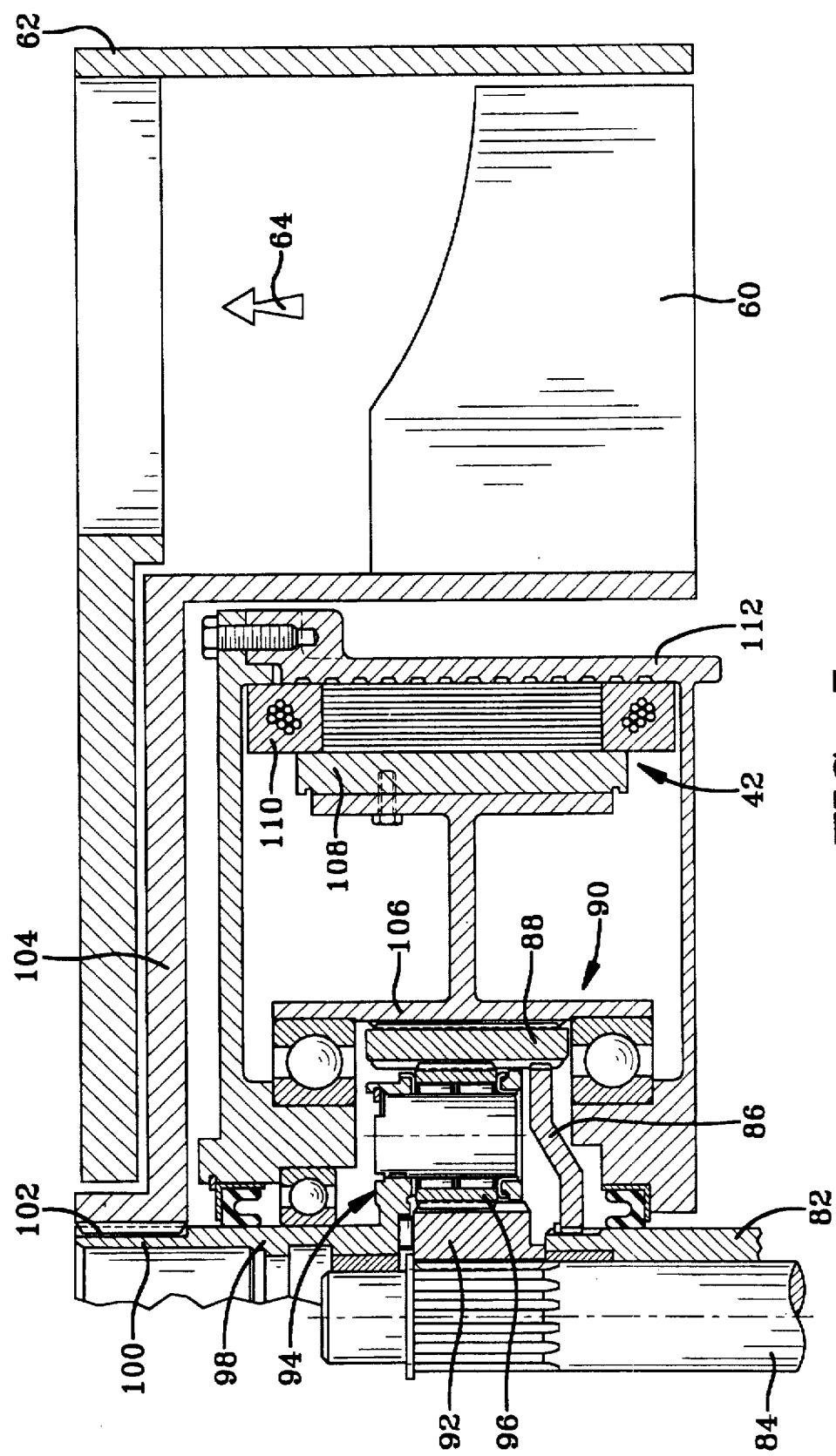
FIG. 5 is a partial elevational view of a generator and fan assembly, wherein a planetary gear unit is incorporated in the drive system.

The fan drive system shown in FIG. 5 includes an input shaft 82 which is driven by the engine 12 which is not shown. A modulating shaft 84 is disposed concentric with input shaft 82. The input shaft 82 has a hub member 86 which is drivingly connected to a ring gear 88 which is a member in a planetary gear arrangement, generally designated 90. The planetary gear arrangement 90 further includes a sun gear 92 driven by the modulating shaft 84 and a carrier assembly 94 on which is rotatably supported a plurality of pinion gears 96. The pinion gears 96 mesh with the sun gear 92 and ring gear 88.

The carrier assembly 94 has a hub or carrier structure 98 which has a shaft extension 100 including a spline portion 102. The spline 102 is drivingly, connected to a hub 104 on which are mounted the fan blades 60. The fan blades 60 rotate with the carrier structure 98 inside of the fan shroud 62 for delivery of air flow in the direction of arrows 64.

The modulating shaft 84 is controlled in any of the manners described above for FIGS. 3 and 4, such that the shaft can be rotated at a speed independent of the speed of the engine. The engine 12 drives the input shaft 82, and therefore ring gear 88, which, in turn, drives a hub 106 which serves as the input shaft or member of a the generator 42. The generator 42 has a rotor 108 driven by the hub 106 and a stator portion 110 which is connected with a stationary housing member 112.

The rotor 108 is driven at a speed proportional to the speed of the engine while the sun gear 92 is driven at a speed equal to the speed of the modulating shaft 84. The carrier assembly 94 is rotated at a speed determined by the speed of the ring gear 88 and the speed of the sun gear 92. If the sun gear 92 is held stationary by the modulating shaft 84, the carrier speed will be subject to an underdrive ratio relative to the input shaft 82 such that the fan blades 60 will rotate at a speed slower than the input shaft 82.

If the speed of the sun gear 92 is increased in the same direction as the rotation of the input shaft 82, the fan speed will increase accordingly. If the speed of the sun gear 92 is increased in a direction opposite to the rotation direction of the input shaft 82, the fan speed will decrease. The decrease in fan speed will continue as the sun gear speed decreases until the speed of the carrier is zero as determined by the ratio of the planetary arrangement. Further changes of speed of the sun gear in this direction will result in the fan operating backward, which would, of course, reverse the air flow 64. Since reverse flow is not desired, this direction of sun gear rotation will not be permitted to exceed the zero speed determination of the carrier assembly 94. Thus, the speed of the fan can be varied from zero to a maximum value depending on the speed at which the modulating shaft 84 can be driven. If the modulating shaft 84 is driven by an independent power source, the fan can be operated at zero engine speed.

Figure 6:
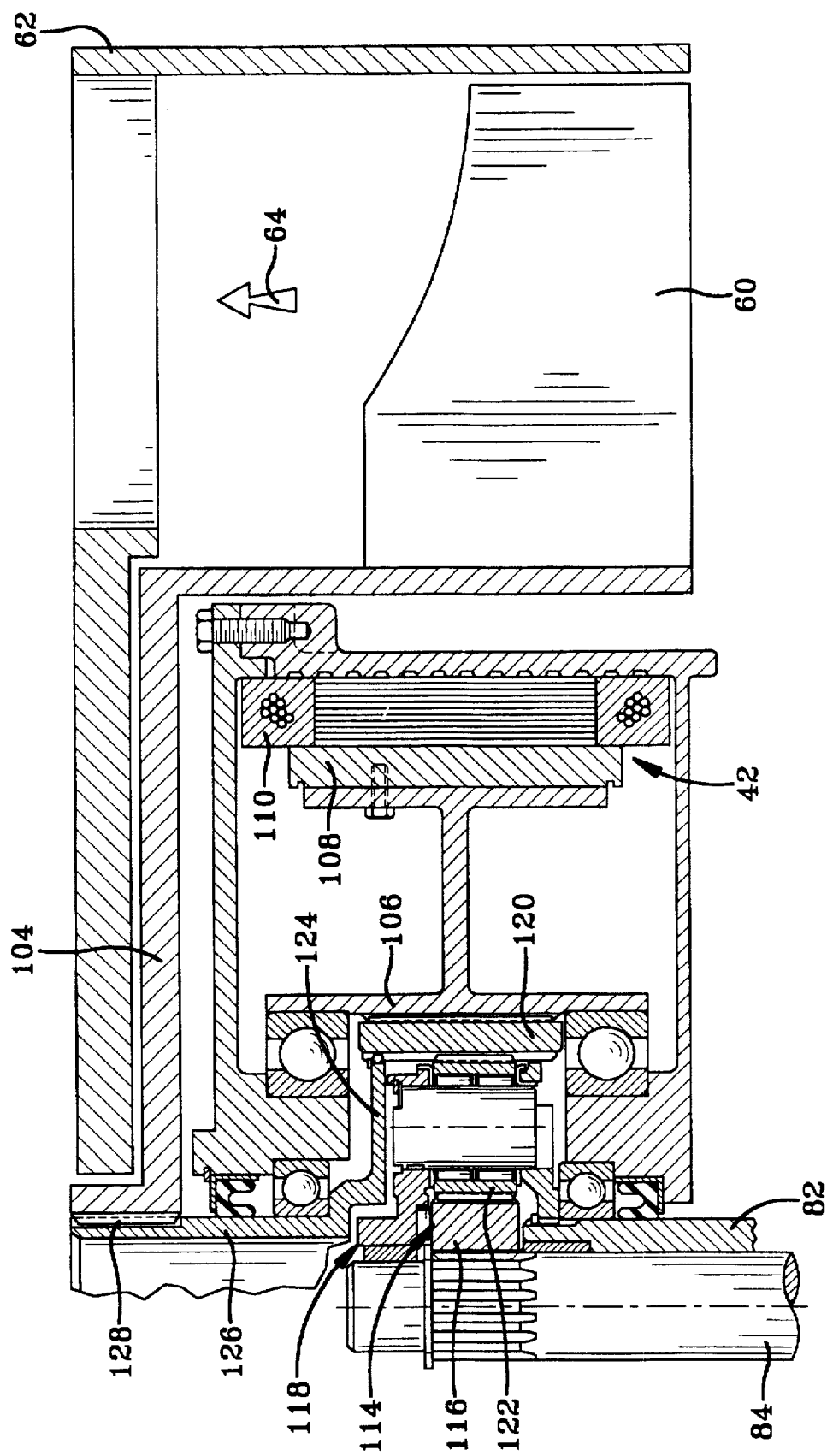
FIG. 6 is a view similar to FIG. 5, wherein the planetary gear arrangement has different drive connections than FIG. 5.

The fan drive mechanism shown in FIG. 6 includes a planetary gear arrangement, generally designated 114, which includes a sun gear 116 driven by the modulating shaft 84, a carrier assembly 118 driven by the input shaft 82, and a ring gear 120 which meshes with the pinions 122 of the carrier assembly 118. The pinions 122 also mesh with the sun gear 116. The ring gear 120 is drivingly connected with the rotor 108, as described above, and also with a hub portion 124 which is drivingly connected with a fan drive shaft 126. The fan drive shaft 126 is connected through a spline 128 with the fan hub 104 to which the blades 60 are connected.

In the planetary arrangement and connection shown in FIG. 6, the rotor for the generator 42 will rotate at the same speed as the hub 104 for the fan. Thus, the generator 42 will vary in speed with the fan at a level independent of the engine speed as represented by the input shaft 82. With the input shaft 82 driving the carrier assembly 118, and the modulating shaft 84 being held stationary, an overdrive relationship is formed within the planetary gear assembly 114. As is well known, with an overdrive relationship, the ring gear 120 will rotate faster than the carrier assembly 118, such that the speed of the fan 16 and generator 42 will be greater than the speed of the input shaft 82.

If the sun gear 116 is increased in speed by the modulating shaft 84 in the same direction of rotation as input shaft 82, the speed of the ring gear 120 will decrease, such that when the carrier assembly 118 and sun gear 116 are rotated at the same speed, the ring gear 120 will also rotate at this speed. Further increases in the speed of sun gear 116 in this direction will result in reductions of the speed of ring gear 120. Thus, the sun gear 116 can be driven at a speed in the direction of the input shaft 82, such that the ring gear speed would be zero and therefore the fan and generator speeds will be zero.

If the sun gear 116 is rotated in a direction opposite to the input shaft 82, the speed of the ring gear 120 will increase above the overdrive speed referred to above. Thus, the speed of the ring gear can be increased considerably relative to the speed of the input shaft 82.

In view of the foregoing description and discussions of the various drive trains available, it should be apparent that the speed of the fans can be adjusted considerably relative to the speed of the engine 12. This will permit the fans 16 and 18 to be driven at high speeds, if necessary, when the engine 12 is at idle, such that high volumes of air cooling will be available. This system will also permit the fans 16 and 18 to be reduced in speed whenever significantly more horsepower is required from the engine to drive the vehicle. The compactness of the drive system between the generator and the fans, by incorporating the coaxial shafts, reduces the space requirement of the vehicle drive train compartment while not affecting the efficiency of the system.

With the variable fan speed controls, the efficiency of this system is increased considerably, such that the present invention affords two advantages to the presently known vehicle drive train compartments.

What is claimed is:

1. A fan and generator drive assembly comprising:

a prime mover having a power output shaft;

a generator having an input shaft;

a fan having a central cavity housing said generator and an input member coaxial with the generator input shaft;

a planetary gear mechanism comprised of a first planetary member drivingly connected with the generator input shaft, a second planetary member drivingly connected with said fan input member, and a third planetary member drivingly connected with a second input shaft disposed coaxially with the generator input shaft;

means including said planetary gear mechanism for rotating the generator at a first speed relative to the power output shaft; and variable speed means for rotating said second input shaft at a variable speed relative to the generator input shaft.

2. A fan and generator drive assembly comprising:

an input shaft;

a planetary gear mechanism comprised of first, second and third planetary members supported for rotating relative to each other, said first planetary member being drivingly connected with said input shaft;

a modulated shaft drivingly connected with said second planetary member;

an electric generator having an input shaft drivingly connected for rotation by one of said planetary members;

a fan mechanism having an input shaft drivingly connected for rotation by said third planetary member; and variable speed means for enforcing rotation of said modulated shaft at a plurality of speeds different from a speed of the input shaft to rotate at least said fan mechanism at a speed determined by the speeds of the first and second planetary members.

3. A fan and generator drive assembly comprising:

an input shaft having a first speed;

a modulated shaft;

variable speed means for rotating said modulated shaft at a plurality of speeds independent of said input shaft speed;

gear means having a first gear member driven by the input shaft and a second gear member driven by said modulated shaft;

a generator having a shaft driven by one of said gear members;

a fan having a shaft coaxial with said generator shaft and driven by said second gear member at a speed modulated from said speed of said input shaft in proportion with said speed of said modulated shaft.

* * * * *